United States Patent [19]
Asada et al.

[11] 3,931,135
[45] Jan. 6, 1976

[54] PROCESS FOR REUSING POLYMERIZATION SOLVENT BY RECYCLING

[75] Inventors: Mamoru Asada; Akinobu Shiga; Kiyoshi Matsuyama, all of Niihama, Japan

[73] Assignee: Sumitomo Chemical Company, Limited, Osaka, Japan

[22] Filed: Dec. 17, 1973

[21] Appl. No.: 425,594

[30] Foreign Application Priority Data
Dec. 16, 1972   Japan............................ 47-126351
Dec. 16, 1972   Japan............................ 47-126352

[52] U.S. Cl. ...... 260/93.7; 260/94.9 E; 260/94.9 F; 260/94.9 P
[51] Int. Cl.²... C08F 2/14; C08F 4/52; C08F 10/00
[58] Field of Search.......... 260/94.9 P, 94.9 F, 93.7, 260/94.9 E

[56] References Cited
UNITED STATES PATENTS

| | | | |
|---|---|---|---|
| 3,058,963 | 10/1962 | Vandenberg | 260/88.2 R |
| 3,160,622 | 12/1964 | Gilbert et al. | 260/94.9 P |
| 3,227,526 | 1/1966 | Scoggin | 260/94.9 P |
| 3,303,178 | 2/1967 | Krishnamurthy | 260/94.9 E |
| 3,309,350 | 3/1967 | Kelley et al. | 260/94.9 E |

FOREIGN PATENTS OR APPLICATIONS

| | | | |
|---|---|---|---|
| 887,707 | 1/1962 | United Kingdom | 260/94.9 P |

*Primary Examiner*—Alan Holler
*Attorney, Agent, or Firm*—Sughrue, Rothwell, Mion, Zinn & Macpeak

[57] ABSTRACT

A process for polymerizing α-olefins in a solvent under conditions such that the polymer formed grows as particles, in which the process comprises reusing a greater part of the solvent used for the polymerization by recycling the solvent to the polymerization zone without carrying out any purification treatment.

2 Claims, No Drawings

PROCESS FOR REUSING POLYMERIZATION SOLVENT BY RECYCLING

BACKGROUND OF THE INVENTION

1. FIELD OF THE INVENTION

The present invention relates to a process for polymerizing α-olefins in a solvent under the condition that the polymer formed grows as particles, in which the process comprises reusing a greater part of the solvent used for the polymerization by recycling the solvent to the polymerization zone without carrying out any purification treatment. In greater detail, the present invention relates to a process which comprises carrying out a slurry polymerization reaction of α-olefins in the presence of a Ziegler-Natta catalyst, and particularly a polymerization reaction of ethylene and propylene, using an inert hydrocarbon liquid or a liquefied monomer to be polymerized as a solvent or as a dispersing agent (hereinafter, it is called a solvent), wherein said process is characterized by that the solvent and the produced polymer are separated before adding a polymerization inhibitor or a catalyst decomposing agent to the polymerization reaction product, and the separated solvent is reused by recycling to the polymerization reactor.

2. DESCRIPTION OF THE PRIOR ART

The polymerization of α-olefins in the presence of a Ziegler-Natta catalyst is generally carried out in an inert hydrocarbon liquid or a liquefied monomer. The temperature at which the polymer formed exists in the liquid as solid particles is usually used in the reaction. As is well known, since the catalysts used in such a polymerization are generally compound systems consisting mainly of a compound of a transition metal, such as titanium and vanadium, and an organic compound of a metal, such as aluminium, the polymers produced contain these metals. Accordingly, in such a polymerization, an important post treatment of the polymer is the removal of the catalyst from the polymer by dissolution and extraction simultaneously with the stopping of the polymerization reaction.

The stopping of the polymerization reaction and the solubilization and extraction of the catalyst are usually carried out in the form of a solvent slurry, because the polymer formed is a solid. It is operationally advantageous that this solvent be that which is used in the polymerization. However, since the polymerization inhibitor and the solubilizing agent (usually alcohols are used for both purposes) added in the step of treating the catalyst are, as a matter of course, catalyst poisons and the decomposition product formed by the treatment of the catalyst are also metal compounds, it is not practical to utilize the solvent containing such metals for polymerization by recycling the solvent to the polymerization zone as it is. Therefore, it is impossible to use the same solvent for the polymerization by recycling the solvent if the solvent is not purified using a distillation, etc. Thus, this is an important disadvantage of the slurry polymerization process utilizing a solvent from the standpoint of cost.

SUMMARY OF THE INVENTION

The present inventors have succeeded in removing this disadvantage by using a solvent for the polymerization and a solvent for the post treatment. That is, the present inventors have found a process wherein a solvent used in the polymerization step is circulated to the polymerization step without adding a catalyst and a solvent used in the post treatment is circulated in the post treatment step after removing the catalyst decomposition products to the degree necessary to reuse the solvent in only the post treatment step, by which not only the quantity of the solvent necessary for purification by distillation and the purification degree of the solvent can be reduced but also the catalyst can be effectively utilized.

DETAILED DESCRIPTION OF THE INVENTION

One of objects of the present invention, which will be clear in the following description, is to remarkably decrease the quantity of the solvent for polymerization which must be purified by distillation by circulating it only in the polymerization step. Another object is to keep low the distillation degree (the degree of separating the solvent and the catalyst treating agent) by circulating the solvent for the post treatment in only the post treatment step. These objects contribute to a decrease in the cost of the distillation of the solvent and consequently they contribute to a decrease of the cost of the polymer.

A further object of the present invention is to provide a process in which not only the solvent is effectively utilized by circulating the solvent for polymerization in the polymerization step without adding a catalyst treating agent but also the catalyst is effectively utilized by circulating the catalyst components dissolved in the solvent and fine solid catalyst particles. Furthermore, another object of the present invention is to facilitate the circulation of α-olefins by removing the α-olefin monomers dissolved in the solvent or the α-olefins themselves as the solvent from the post treatment step without bringing them into contact with the catalyst treating agent.

Further, the present inventors found that the yield of the solvent insoluble polymer which is of great value industrially can surprisingly be improved by using a specific catalyst system without the necessity of reducing the polymerization rate whereby the industrial advantages of the process are unexpectedly increased. That is, another feature of the present invention is to provide a process for the polymerization of an α-olefin which comprises polymerizing alpha-olefin by a mass polymerization or a suspension polymerization using a catalyst system consisting of, as a catalyst component (A), titanium trichloride or an eutectic mixture of titanium trichloride and a metal halide, and, as a catalyst component (B), an organo-aluminum compound represented by the formula $AlR_{3-n}Cl_n$ wherein R represents an alkyl group and n is a value of 0 to 1, recycling after completion of the polymerization but prior to the separation of the catalyst, an appropriate amount of the solvent separated from the resulting solvent insoluble polymer without purification of the solvent, adding an additional amount of a purified solvent and fresh catalyst components A and B to the recycled solvent and further polymerizing the solvent-insoluble polymer.

As is set forth above, the catalyst system used in the present invention should be a combination of the component (A), titanium trichloride or an eutectic mixture of titanium trichloride and a metal halide, and the component (B), an organo-aluminum compound represented by the formula $AlR_{3-n}Cl_n$ wherein R and n are as defined above. The catalyst component (A) can be a titanium trichloride prepared by any of various procedures, but it is preferably an eutectic mixture of titanium trichloride and aluminum chloride obtained by reducing titanium tetrachloride with aluminum metal, or titanium trichloride obtained by reducing titanium tetrachloride with an organo-aluminum compound such as triethyl aluminum, diethyl aluminum chloride, sesquialuminum chloride or the like under limited conditions. The catalyst component (B) can be trimethyl aluminum, dimethyl aluminum chloride, triethyl aluminum, tri-n-propyl aluminum, di-n-propyl aluminum chloride, triisopropyl aluminum, diisopropyl aluminum chloride, triisobutyl aluminum, diisobutyl aluminum chloride, tri-n-hexyl aluminum, di-n-hexyl aluminum chloride or a mixture thereof, preferably a mixture of triethyl aluminum-diethyl aluminum chloride or diethyl aluminum chloride. The proportion of the component (A) and the component (B) in the catalyst system varies depending upon the type of the component (B) used, but generally the molar ratio of B/A is 1 to 20. Since the solvent reused in the second polymerization generally contains the catalyst component (B) which is soluble in the solvent at usual polymerization temperatures, the second polymerization can be effected, once the polymerization is conducted using the above catalyst system (hereinafter referred to "initial polymerization"), for example, in a batch manner, by feeding an additional amount of only the catalyst component (A) to the polymerization zone. Of course, the catalyst-forming ability of the catalyst component (B) which is used in the initial polymerization is lower than that of a fresh catalyst component (B) and, therefore, the activity of the polymerization in the second polymerization tends to be lowered in the second polymerization. However, the activity of the polymerization in the second polymerization can be maintained as high as more than 70% of the activity in the initial polymerization of feeding a fresh catalyst component (B) to the polymerization zone. In particular, when an organo-aluminum compound having the above formula wherein $n$ is near 0.9 is used, the overall yield of the solvent insoluble polymer in the polymerization process of this invention can be improved by about 10% as compared with the yield in the first polymerization, i.e., the yield obtainable in the conventional process. The above improvement is believed to be unexpected from conventional techniques, and the process of this invention makes it possible to advantageously utilize the catalyst component (B) which has not been considered to be used industrially due to the production of a large quantity of a solvent-soluble polymer which is of less value industrially.

The amount of the catalyst component (B) fed into the second polymerization can be approximately the same as or lower than that used in the initial polymerization. A higher amount of the component (B) can be used without adversely affecting the polymerization but is not preferred from the standpoint of economy and the increase in the amount of residual catalyst contained in the desired solvent-insoluble polymer. That is, when a fresh catalyst component (B) is fed in an amount corresponding to the difference between the amount of component (B) consumed in the initial polymerization and the amount of component (B) fed by the recycling solvent, the residual catalyst remaining in the solvent-insoluble polymer can be lowered to the same level as that of the polymer obtainable by the conventional process. When the amount of the catalyst component (B) fed to the second polymerization is further decreased, the amount of the residual catalyst in the resulting polymer naturally decreases whereby the quality of the polymer is improved.

Suitable examples of the solvent for the polymerization are aliphatic hydrocarbons such as a propylene monomer, propane, butane, pentane, hexane, heptane, octane and the like, aromatic hydrocarbons such as benzene, toluene and the like. The polymerization can be carried out at a temperature in the range of room temperature (about 20° ~ 30°C) to 100°C, preferably 50° to 80°C under atmospheric pressure to 50 Kg/cm$^2$ (gauge). When the polymerization is conducted in the presence of hydrogen, the molecular weight of the resulting solvent-insoluble polymer can be adjusted to the desirable value without adversely affecting the crystallinity of the polymer.

When homo- or copolymerization of $\alpha$-olefins such as ethylene and propylene is carried out in the presence of an inert hydrocarbon liquid such as an aliphatic hydrocarbon, e.g., hexane and heptane, using a catalyst consisting of a solid metal compound, such as titanium trichloride, and an organic metal compound, such as diethyl aluminum chloride, at a temperature of 40° to 80°C under a pressure of 5 to 50 Kg/cm$^2$G, the resulting polymerization product is a slurry composed of a greater part of a powder polymer and a lesser part of a solvent soluble polymer. The liquid phase of this slurry consists of a solvent for polymerization, a solvent soluble polymer and soluble organic metal compounds, such as ethyl aluminium chloride. This slurry is treated under a reduced pressure or at normal pressure using, for example, a liquid cyclone or a centrifugal separator in an inert atmosphere to separate the solid and the liquid. If the slurry is treated under a reduced pressure, it is possible to return the $\alpha$-olefin monomers to the polymerization zone directly, because the $\alpha$-olefin monomers which have dissolved under high pressures are volatile. If the slurry is not treated under a reduced pressure, it is necessary to separate the solid and the liquid under a high pressure. However, the increase of the pressure for circulating the liquid phase is small because the solvent including $\alpha$-olefins or the liquefied $\alpha$-olefin is permitted to circulate in the polymerization zone. When a liquid cyclone is used for separating the liquid and the solid, separation is not completely carried out and sometimes the liquid in an amount larger than the amount of the polymer is carried over into the solid phase. In such case, since solids having a fine particle size are also carried over into the liquid phase, it is also possible to return again the catalyst particles to the polymer zone, for example, in a continuous polymerization process wherein the catalyst particles are not retained sufficiently and the formation of the polymer is small.

Further, in a case of using a centrifugal separator, it is possible to increase the quantity for circulation because the separation can be carried out to a considerable extent. In general, since the concentration of the polymer in the solvent in the polymerization zone is 2 to 5 l of the solvent/1 Kg of the polymer and the concentration of a wet cake after separation of the liquid and the solid is 0.2 to 1 l of the solvent/1 Kg of the polymer, the quantity of the solvent for circulation is 96 to 50% of the solvent in the polymerization zone. Namely, the quantity of the purified solvent for polymerization is 4 to 50% of the prior method. Especially, in the case of producing polypropylene, the quantity of by-product solvent soluble polymers, such as atactic polypropylene is large, by which it is necessary to control the content of such polymers in a definite range. Therefore, the quantity for circulation is based on considerations of this condition.

The polymer separated from the solvent by the above described method contains a large amount of solid components of the catalyst such as titanium trichloride and a small amount of liquid components such as diethyl aluminium chloride. In order to remove these components, it is necessary to provide good contact by supplying a polymerization inhibitor and a catalyst decomposing agent, e.g., alcohols such as methanol, isopropanol and butanol, to a mixture of solvents with stirring. In this case, any inert hydrocarbon liquid can be used as a solvent for forming a re-slurry. But, preferably, the same solvent as that used for the polymerization should be used. If the solvent in the polymerization zone is a liquefied monomer per se, it is convenient to use a common solvent, such as hexane and heptane.

The catalyst is decomposed and becomes solvent-soluble by forming a re-slurry in the solvent in the presence of alcohols. In order to treat this re-slurry, several methods are known. For example, there is a method which comprises washing the slurry with an acidic aqueous solution, a method which comprises washing with an alkaline aqueous solution, a method with comprises removing the solvent and washing the polymer again with the solvent, and a method which comprises washing with water. Regardless of the method, it is possible to use the process of the present invention in any of these methods. Namely, after dissolving the catalyst, the solvent containing the solubilized catalyst or the solvent from which the catalyst is removed by washing with water is separated from the polymer produced, and then the residual catalyst and the soluble polymers in the solvent are removed. Then the treated solvent is circulated again without completely removing the alcohols into the step of forming a re-slurry of the polymer or the step of decomposing the catalyst. Since the solvent used in the polymerization step is not carried into the washing step as much, it is not necessary to regenerate the solvent in a large amount by high purification. Even if it is distilled, the distillation can be carried out using a simple apparatus.

In the following, examples are shown by which the present invention will be illustrated. However, the present invention is not limited to these examples. Unless otherwise indicated all parts and percents are by weight.

EXAMPLE 1

Primary polymerization

After a 200 l autoclave was charged with propylene, 100 l of purified heptane for polymerization was charged therein. Then hydrogen was introduced so that a concentration of the gas phase at the polymerization conditions was 3% by volume. 24 g of titanium trichloride (AA, produced by Stauffer Co.) and 1.5 l of a heptane solution containing 100 g of diethyl aluminium chloride were added thereto. The temperature of the reactor was increased to 60°C while stirring. The pressure of the reactor was then increased to 6 Kg/cm$^2$G by introducing propylene monomer to initiate polymerization. Propylene and hydrogen were introduced so as to keep the pressure at 6 Kg/cm$^2$G and the hydrogen gas concentration at 3%. The polymerization reaction was continued for 5 to 6 hours until the quantity of propylene introduced reached 1 Kg/1 g of titanium trichloride AA.

After conclusion of the polymerization, the mixture was introduced into a centrifugal separator (superdecantor, produced by Sharpress Co.) under a nitrogen atmosphere to separate the liquid and solid. The separated liquid phase was charged into another 200 l autoclave which was filled with propylene. On the other hand, the separated solid phase was added to heptane to form a re-slurry. n-Butanol was then added to this slurry to decompose the catalyst. After washing the slurry with water, the water was removed. The slurry was treated again with a centrifugal separator to produce solvent insoluble polymer particles. After drying, they were weighed. The yield of the polymer particles was 900 g/1 g of titanium trichloride AA.

Volume of the separated liquid phase was 83 l (after removing propylene). When the amount of atactic polypropylene dissolved therein was determined by sampling a part of the liquid phase, it was found to be 13 g/l of heptane. Accordingly, the entire amount of atactic polypropylene formed was 1.3 Kg. Thus, the yield of the granular polymer in all of the polymers produced was 94.5% and the average polymerization rate was 170 g of the polymer/1 g of titanium trichloride AA.Hr.

Re-polymerization

The liquid phase separated at the first separation step of the primary polymerization was polymerized again using another 200 l autoclave. Since the heptane separated in the primary polymerization was about 80 liters, 20 liters of fresh purified heptane were added thereto to make 100 l. Then the polymerization of propylene was carried out using the same procedures as in the primary polymerization using 24 g of titanium trichloride AA and 1.5 l of a heptane solution containing 100 g of diethyl aluminium chloride in the presence of 3% by volume of hydrogen at 60°C under 6 Kg/cm$^2$G. Period of time for the amount of polypropylene introduced to reach 1 Kg/1 g of titanium trichloride AA was 6.0 hours.

After carrying out the same post treatment as that of the primary polymerization, the total amount of polymers produced in re-polymerization were 23.1 Kg. The amount of granular polymer was 22.0 Kg, the yield of which based on the total amount of polymers being 95.3%. The average polymerization rate was 160 g of the polymer/1 g of titanium trichloride AA.Hr. No adverse influence was observed in the re-polymerization. As is clear, the amount of the solvent necessary for purification was only 20% of the total amount of the solvents necessary to carry out the polymerization, which meant a remarkably decreased amount.

EXAMPLE 2

Primary polymerization

The pressure in a 5 l stainless steel autoclave equipped with a stirrer was reduced and hydrogen at a pressure of 120 mmHg was introduced. Then, 2.0 l of n-heptane was charged into the autoclave together with 0.5 g of titanium trichloride (AA, produced by Toho Titanium Co.) and 37.5 moles of a diethyl aluminium chloride-triethyl aluminium mixture in a molar ratio of 9/1. The temperature was maintained at 70°C. The pressure was kept at 6 Kg/cm$^2$ gauge by introducing propylene. Introduction of the monomer was stopped when the amount of monomer introduced reached 500 g/g-$TiCl_3$. Then the supernatant solution was removed through a pipe and introduced into another 5 l autoclave (equipped with a stirrer, in which hydrogen at a pressure of 120 mmHg was introduced under a reduced pressure). The residual slurry was treated with n-BuOH to decompose the catalyst. After washing the slurry with water, it was removed from the autoclave and filtered. The solvent insoluble polymer was dried and weighed. On the other hand, the filtrate was evaporated and the concentration of the soluble polymer was determined, from which the total amount of soluble polymer was calculated.

Re-polymerization

Since the amount of the solution removed was 1.3 l, 0.7 l of purified heptane was added. Further, 0.5 g of titanium trichloride (AA, produced by Toho Titanium Co.) and 13.1 mmoles of a diethyl aluminium chloride-triethyl aluminium mixture in a molar ratio of 9/1, by which the total amount became 37.5 mmoles of the catalyst component B in the re-circulation solvent, were charged into an autoclave. Polymerization was carried out using the same conditions as in the primary polymerization. After conclusion of the polymerization, n-butanol was added to decompose the catalyst. After washing the contents with water, the contents were removed from the autoclave and filtered. The solvent insoluble polymer was dried and weighed. The amount of the soluble polymer produced in the re-polymerization step was the value obtained by subtracting the amount of the soluble polymer previously coexisting in the re-circulation solvent.

The results of the primary polymerization and the re-polymerization are shown in Table 1.

It can be understood from the results contained in Table 1 that the yield of the solvent insoluble polymer according to this example of the invention increased to 92.3% by carrying out the re-polymerization step, while it is only 78.3% of the total polymers according to the prior technique (that is, the primary polymerization). Further the polymerization rate does not change and, or course, the amount of catalyst ash hardly changes.

EXAMPLE 3

Primary polymerization

Into a 1 l electromagnetic agitation type stainless steel autoclave in which the pressure had been reduced, 0.1 g of titanium trichloride (AA, produced by Toho Titanium Co.) and 12.5 mmoles of a diethyl aluminium chloride-triethyl aluminium mixture previously prepared by mixing these components in a molar ratio of 8/2 were charged. Then, 410 g of liquefied propylene was introduced. Polymerization was carried out at 60°C for 2.5 hours. After conclusion of the polymerization, the autoclave was cooled in a dry ice-methanol bath. On the other hand, 0.1 g of titanium trichloride (AA, produced by Toho Titanium Co.) and 3 mmoles of a diethyl aluminium chloride-triethyl aluminium mixture prepared previously by mixing these components in a molar ratio of 8/2 were charged into another 1 l electromagnetic agitation type stainless steel autoclave, the pressure in which had been reduced. This autoclave was also cooled in a dry ice-methanol bath. The supernatant liquefied propylene was removed from the autoclave for the primary polymerization and transferred into the other autoclave. To the residual slurry, n-BuOH and n-heptane were added to decompose the catalyst. After the slurry was washed with water, it was removed from the autoclave and filtered. The resulting solvent insoluble polymer was dried and weighed. On the other hand, the filtrate was distilled to produce a soluble polymer.

Re-polymerization

The supernatant propylene removed at the primary polymerization was 190 g. Then, 220 g of purified liquefied propylene was added thereto and polymerization was carried out at 60°C for 2.5 hours. After conclusion of the polymerization, the autoclave was cooled in a dry ice-methanol bath. After the supernatant liquefied propylene was removed, n-BuOH and n-heptane were added to the residual slurry to decompose the catalyst. After the slurry was washed with water, it was removed from the autoclave and filtered. The resulting solvent insoluble polymer was dried and weighed. On the other hand, the filtrate was distilled to produce a soluble polymer, which was dried and weighed. The quantity of the soluble polymer obtained in the re-polymerization was calculated by subtracting the amount of the polymer coexisting in the re-circulation liquefied propylene (calculated amount) from the total amount of the soluble polymers. The results of the primary polymerization and the re-polymerization are shown in Table 1. From the results contained in Table 1, it is clear that reuse by circulation is effective in the case of mass polymerization in this example.

EXAMPLE 4

Primary polymerization

Polymerization was carried out using the same conditions as those in the primary polymerization of Example 1 but the catalyst component B consisted of 37.5 mmoles of diethyl aluminium chloride. After the polymerization, the supernatant solution was removed in the same manner and the polymer was recovered in the same manner as in the primary polymerization of Example 1.

Re-polymerization

Since the solution removed was 1.4 l, 0.6 l of fresh n-heptane was added. Polymerization was carried out under the same conditions as those in Example 1 but 8.75 mmoles of diethyl aluminium chloride were added so as to become 20 mmoles if combined with the catalyst component in the re-circulation solvent. After polymerization, the polymer produced was recovered using the same procedures as in Example 1. The results of the primary polymerization and the re-polymerization are shown in Table 1. It is understood from the results contained in Table 1 that the yield of the crystalline polymer increased about 1% by re-polymerization in the case of using diethyl aluminium chloride as the catalyst component B. Further, the quantity of the residual catalyst in the solvent insoluble polymer was of course smaller than the prior technique.

EXAMPLE 5

Primary polymerization

The primary polymerization was carried out using the same procedure as in the primary polymerization of Example 1 but 19.8 mmoles of diisobutyl aluminium chloride was used as the catalyst component B. After the polymerization, the supernatant solution was removed in the same manner and the polymer was recovered in the same manner as in Example 1.

Re-polymerization

The solution removed was 1.4 l. The re-polymerization was carried out using the same procedure as in the re-polymerization in Example 1 but 0.6 l of n-heptane and 5.94 mmoles of diisobutyl aluminium chloride were added.

The results of the primary polymerization and the re-polymerization are shown in Table 1.

It is understood from the results in Table 1 that when diisobutyl aluminium chloride was used as the catalyst component B, the yield of the solvent insoluble polymer increased as compared with the prior technique (primary polymerization).

EXAMPLE 6

Primary polymerization

Polymerization was carried out using the same conditions as those in Example 1. The recovery of the polymer was carried out using the same procedure.

Re-polymerization 1

Since the solution removed was 1.3 l, 0.7 l of fresh n-heptane was charged into the autoclave. Further, 13.1 mmoles of a diethyl aluminium chloride-triethyl aluminium mixture which was previously prepared by mixing these components in a ratio of 9/1 was added thereto, by which the catalyst became 37.5 mmoles if combined with the catalyst component B in the re-circulation solvent. The polymerization was carried out using the same procedure as that of the primary polymerization. After the polymerization, the supernatant solution was removed in the same manner and the polymer was recovered in the same manner as that in the primary polymerization.

Re-polymerization 2

Since the solution removed was 1.35 l, 0.65 l of fresh n-heptane was added. The re-polymerization was carried out using the same procedure as in re-polymerization 1 but the catalyst component B was 12.2 mmoles. The treatment after polymerization was carried out in the same manner as in re-polymerization 1.

The same re-polymerization was repeated 12 times.

Results of the primary polymerization and the re-polymerization are shown in Table 1. It is understood from the results in Table 1 that when the re-polymerization is repeated, the polymerization rate decreased gradually to about 85% of the primary polymerization. On the contrary, the yield of the solvent insoluble polymer remarkably increased from 78% to 93 ~ 94%.

Table 1

| Example | Catalyst Component A (g) | Catalyst Component B (molar ratio) | Catalyst Component B (m mole) | Primary Polymerization Polymerization Time (hr) | Yield of Polymer (g) IP | Yield of Polymer (g) SP | Polymerization Rate R | ISP (%) | Residual Catalyst (ppm) |
|---|---|---|---|---|---|---|---|---|---|
| Example 2 | 0.5 | DEAC-TEA (9:1) | 37.5 | 1.42 | 247 | 68.5 | 410 | 78.3 | 200 |
| Example 3 | 0.1 | DEAC-TEA (8:2) | 12.5 | 2.5 | 83.2 | 46.8 | 533 | 64.0 | 112 |
| Example 4 | 0.5 | DEAC | 37.5 | 1.92 | 267 | 19.4 | 288 | 93.3 | 213 |
| Example 5 | 0.5 | DIAC | 19.8 | 4.0 | 264 | 20 | 142 | 93.0 | 133 |
| Example 6 | 0.5 | DEAC-TEA (9:1) | 37.5 | 1.55 | 248 | 69 | 408 | 78.2 | 213 |

| Example | Catalyst Component A (g) | Catalyst Component B (molar ratio) | Catalyst Component B (m mole) | Re-polymerization Polymerization Time (hr) | Yield of Polymer (g) IP | Yield of Polymer (g) SP | Polymerization Rate R | ISP (%) | Residual Catalyst (ppm) |
|---|---|---|---|---|---|---|---|---|---|
| Example 2 | 0.5 | DEAC-TEA (9:1) | 13.1 | 1.33 | 260 | 16.5 | 398 | 92.3 | 210 |
| Example 3 | 0.1 | DEAC-TEA | 3 | 2.5 | 104.6 | 21.4 | 504 | 83.1 | 74 |
| Example 4 | 0.5 | DEAC | 8.75 | 1.92 | 246 | 15 | 274 | 94.1 | 143 |
| Example 5 | 0.5 | DIAC | 5.94 | 4.1 | 261 | 16 | 135 | 94.3 | 129 |
| Re-polymerization in Example 6, 1 | 0.5 | DEAC-TEA (9:1) | 15.0 | 1.30 | 242.5 | 13.5 | 400 | 93.3 | 203 |
| Example 2 | 0.5 | " | 15.0 | 1.42 | 238 | 15 | 356 | 94.0 | 213 |
| Example 5 | 0.5 | " | 15.0 | 1.58 | 253.5 | 14.5 | 340 | 94.5 | 199 |
| Example 10 | 0.5 | " | 15.0 | 1.42 | 245 | 15.5 | 368 | 93.8 | 206 |
| Example 12 | 0.5 | " | 15.0 | 1.37 | 236 | 15.5 | 367 | 93.9 | 211 |

Note:
IP: Solvent insoluble polymer
SP: Solvent soluble polymer
Polymerization Rate: R = W/C.t wherein the total amount of polymer is W (g), the catalyst component is C (g) and the polymerization time is t (hr).
DEAC: Diethyl aluminium chloride
TEA: Triethyl aluminium
DIAC: Diisobutyl aluminium chloride
ISP: Yield of solvent insoluble polymer $$\left(\frac{IP}{IP + SP} \times 100\right)$$

While the invention has been described in detail and with reference to specific embodiments thereof, it will be apparent to one skilled in the art that various changes and modifications can be made therein without departing from the spirit and scope thereof.

What is claimed is:

1. In a process for mass polymerizing or suspension polymerizing α-olefins in a polymerization zone to produce a polymer-polymerization solvent slurry using a catalyst system consisting of, as catalyst component (A), titanium trichloride or an eutectic mixture of titanium trichloride and a metal halide, and, as catalyst component (B), an organoaluminium compound, the improvement which comprises polymerizing the α-olefins using an organoaluminium compound represented by the formula $AlR_{3-n}Cl_n$, wherein R represents an alkyl group and $n$ is about 0.9 as catalyst component (B), said organoaluminium compound being a mixture of trialkylaluminium and dialkylaluminium halide, separating the polymer produced and the solvent before adding a polymerization inhibitor to the polymer, recycling the solvent to the polymerization zone, adding purified fresh solvent, fresh catalyst component (A) and fresh catalyst component (B) to said separated solvent and further carrying out the polymerizing.

2. The process of claim 1 wherein said organoaluminium compound is a mixture of triethyl aluminium and diethyl aluminium chloride.

* * * * *